(12) United States Patent
Yoshitomi et al.

(10) Patent No.: US 12,455,628 B2
(45) Date of Patent: Oct. 28, 2025

(54) INFORMATION PROCESSING SYSTEM

(71) Applicant: Lenovo (Singapore) Pte. Ltd., Singapore (SG)

(72) Inventors: Keiichi Yoshitomi, Kanagawa (JP); Mitsuhiro Yamazaki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/606,646

(22) Filed: Mar. 15, 2024

(65) Prior Publication Data

US 2024/0353928 A1 Oct. 24, 2024

(30) Foreign Application Priority Data

Apr. 21, 2023 (JP) ................. 2023-070086

(51) Int. Cl.
*G06F 3/01* (2006.01)
*G06F 3/04883* (2022.01)
*G06F 3/16* (2006.01)

(52) U.S. Cl.
CPC .......... *G06F 3/016* (2013.01); *G06F 3/04883* (2013.01); *G06F 3/165* (2013.01); *G06F 3/167* (2013.01)

(58) Field of Classification Search
None
See application file for complete search history.

(56) References Cited

U.S. PATENT DOCUMENTS

| 2010/0090815 | A1 | 4/2010 | Yamaya | |
| 2014/0253478 | A1* | 9/2014 | Jeong | G06F 3/04883 345/173 |
| 2017/0046171 | A1* | 2/2017 | Jung | G06F 9/4405 |
| 2017/0285774 | A1* | 10/2017 | Parikh | G06F 3/167 |
| 2018/0164890 | A1* | 6/2018 | Park | G06F 3/0488 |
| 2018/0188941 | A1* | 7/2018 | Kim | G06F 3/038 |

FOREIGN PATENT DOCUMENTS

| JP | H07141094 A | 6/1995 |
| JP | H08190450 A | 7/1996 |
| JP | 2006031410 A | 2/2006 |
| JP | 2007122501 A | 5/2007 |
| JP | 2015057659 A | 3/2015 |
| JP | 2017537395 A | 12/2017 |
| JP | 2022115288 A | 8/2022 |
| WO | 2008078523 A1 | 7/2008 |

* cited by examiner

*Primary Examiner* — Stephen T. Reed
(74) *Attorney, Agent, or Firm* — Osha Bergman Watanabe & Burton LLP (57) ABSTRACT

An information processing system includes: an information processing device; and an input device. The information processing device includes a host system which is configured to display a diagram which is based on an inputting operation which is performed by using the input device and is detected by a touch sensor on a display. A controller of the host system or the input device is configured to acquire a voice signal and the input device includes a vibration generator which is configured to vibrate in accordance with a drive signal which includes the voice signal.

13 Claims, 6 Drawing Sheets

INFORMATION PROCESSING SYSTEM

CROSS-REFERENCE TO RELATED APPLICATIONS

This application claims priority to Japanese Patent Application No. 2023-070086 filed on Apr. 21, 2023, the contents of which are hereby incorporated herein by reference in their entirety.

TECHNICAL FIELD

The present application relates to control of an information processing system and, in particular, relates to control of an input device.

BACKGROUND

A haptic pen is a digital pen which is used for provision of a haptic feedback function. The digital pen is an input device which is used for drawing processing and recording of handwritten letters and so forth. The digital pen is also called an electronic pen, a smart pen, a stylus and so forth. The haptic feedback function is realized by vibrating a vibrator in accordance with contact with a touch panel which displays the letters and so forth. In addition, improvement of usability is promoted by control to the haptic feedback function.

For example, an interactive-type stylus which is to be used together with an interactive-type display device is described in Japanese Translation of PCT International Application Publication No. 2017-537395. The interactive-type stylus includes a stylus main body which has a first end. The first end is configured in order to provide a first function and a second function in a case where it is used by a user. The interactive-type stylus further includes a controller which is configured to drive the first end so as to couple together the first end and an electrode matrix of the interactive type display device capacitively. The capacitive coupling relates to the first function and the second function is rendered ineffective in accordance with automatic sensing of a user's intension so as to use the first function with no explicit input by a user. The interactive-type stylus further has a tactile actuator which is contained in a stylus main body and relates to the second function. To invalidate the second function includes to block the operation of the tactile actuator.

There exists a haptic pen of the type which has a sound feedback function in the haptic pens. In the sound feedback function, writing sounds which mainly accord with a writing operation are synthesized and presented. A frequency band of the sound which is presented includes an audible band and is different from a frequency band of the vibration. In realization of the sound feedback function, use of a loudspeaker which is built in separately from a vibrator induces an increase in cost. It is also conceivable to use a loudspeaker which is installed in a host system main body as a reproduced sound source. The loudspeaker is not necessarily installed on a place where a touch sensor and the input device are brought into contact with each other. Since a position where the sounds actually generate is different from a position where sound generation is expected, a sense of discomfort may be rather induced.

SUMMARY

An information processing system according to one or more embodiments of the present application includes an information processing device and an input device. The information processing device includes a host system which is configured to display a diagram which is based on an inputting operation which is performed by using the input device and is detected by a touch sensor on a display. A controller of the host system or the input device acquires a voice signal and the input device includes a vibration generator which vibrates in accordance with a drive signal which includes the voice signal.

In the above-described information processing system, the controller of the host system or the input device may generate a writing sound signal which indicates a writing sound on the basis of a state of contact with the touch sensor by the inputting operation, may output the writing sound signal to the vibration generator as the voice signal and may stop output of the writing sound signal in a case where the host system acquires a sound source signal which is the voice signal from a sound source.

In the above-described information processing system, in a case where the input device is at a standstill in a state of contact with the touch sensor, the controller of the host system or the input device outputs the sound source signal to the vibration generator and stops output of the writing sound signal to the vibration generator.

In the above-described information processing system, the controller of the host system or the input device may control an output characteristic of the voice signal in accordance with the sound volume of ambient sounds which are picked up by a microphone.

In the above-described information processing system, the controller of the host system or the input device may increase the sound volume of the sound source signal as the sound volume of the ambient sounds is increased.

In the above-described information processing system, the controller of the host system or the input device may stop output of the writing sound signal in a case where the sound volume of the ambient sounds exceeds a predetermined reference sound volume.

In the above-described information processing system, the information processing device may include the touch sensor and the display and the controller of the host system or the input device may include a mixer which generates a vibration signal on the basis of a state of contact with the touch sensor and generates the drive signal by synthesizing the vibration signal and the voice signal.

In the above-described information processing system, the voice signal may have a frequency component which is more than 300 Hz and the vibration signal may have a frequency component which is less than 500 Hz.

In the above-described information processing system, the host system may have a function that it serves as a sound source which generates the sound source signal.

According to one or more embodiments of the present application, it becomes possible to present sounds economically and with no discomfort.

DETAILED DESCRIPTION

In the following, one embodiment of the present application will be described with reference to the drawings. First, a configuration example of an information processing system S1 according to one embodiment of the present application will be described. In the following description, a case where an information processing device 1 is a tablet terminal and an input device 30 is a digital pen which has a tactile presentation function will be mainly described. The digital pen is a pen-shaped operation medium and is configured as a writing device. In the present application, there are cases where the digital pen is simply called "the pen".

Figure 1:
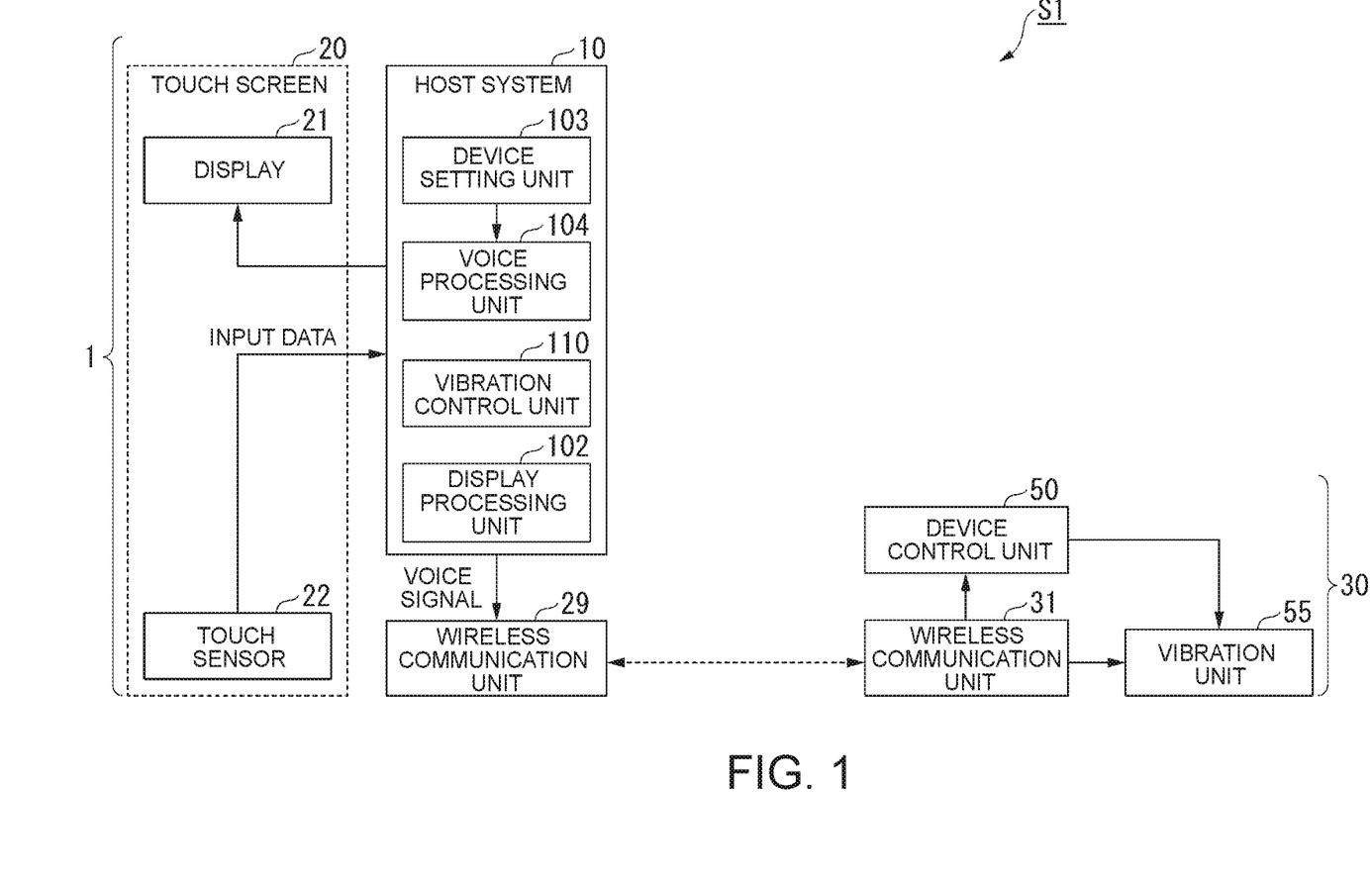
FIG. 1 is a block diagram illustrating one example of a schematic configuration of an information processing system according to one or more embodiments of the present application.

FIG. 1 is a block diagram illustrating one schematic configuration example of the information processing system S1 according to one or more embodiments of the present application. The information processing system S1 includes the information processing device 1 and the input device 30.

The information processing device 1 includes a sound source and the sound source outputs a voice signal to the input device 30. The input device 30 includes a vibration unit 55 which applies the voice signal as a drive signal and vibrates in accordance with the drive signal.

The information processing device 1 has a touch screen 20 and convers the most part of the surface of a chassis. The touch screen 20 is configured by mutually superimposing a display surface of a display 21 and a detection surface of a touch sensor 22. Other members of the information processing device 1 are housed in the chassis.

The input device 30 is used for inputting or editing data on letters, symbols, diagrams and so forth by being gripped by a user and being moved while approaching or coming into contact with the surface of the touch screen 20. The display 21 displays a display screen which contains various kinds of information to be visible on its surface. The touch sensor 22 detects an inputting operation which is performed on its surface by using the input device 30. The information processing device 1 monitors presence/absence of the inputting operation, specifies a position where the inputting operation is detected and executes data input or data edition which is based on the inputting operation. The information processing device 1 makes the display screen of the display 21 display, for example, a locus of a contact position where the user comes into contact with the touch sensor 22 or a diagram which is derived from the locus (also called writing input or drawing input in some cases). The information processing device 1 may also control an output characteristic of the voice signal to the input device 30 in accordance with the contact state which is detected.

The touch sensor 22 detects contact with the display screen or coming closer (hovering) to a point which is located within a certain distance and specifies the position thereof as the inputting operation using the input device 30. The touch sensor 22 generates input data which contains detection information which indicates the contact or approaching which is detected and the position thereof and outputs the input data which is generated to a host system 10 of the information processing device 1. The touch sensor 22 may detect a pressure at a contact position which is the position where the touch sensor 22 comes into contact with the input device 30 as a contact pressure and may output information on the detected contact pressure to the host system 10 by containing the information on the contact pressure which is detected into the input data. The touch sensor 22 may also detect an angle which is made relative to the display screen in a longitudinal direction of the input device 30 as a pen angle. The touch sensor 22 may also output information on the pen angle which is detected to the host system 10 in a state of containing the information on the detected pen angle in the input data.

The host system 10 is a computer system which controls all the functions of the information processing device 1. The host system 10 includes a display processing unit 102, a device setting unit 103, a voice processing unit 104 and a vibration control unit 110.

The device setting unit 103 makes the display 21 display, for example, a device setting screen (not illustrated) as the screen to be displayed on the display 21. The device setting screen is a screen for setting a function of a device which is connected with the information processing device 1 in a wired or wireless state. The device setting screen is used, for example, for setting necessity/unnecessity of voice presentation to a voice presentable device which makes the voice presentation possible, the sound volume and so forth, necessity/unnecessity of vibration presentation to a vibration presentable device which makes vibration presentation possible and so forth. On the device setting screen, a screen component for instructing the sound volume may be also arranged on the voice presentable device. The sound volume corresponds to an amplitude of the voice signal or to a gain to an amplitude reference value. The input device 30 which pertains to one or more embodiments of the present application belongs to both of the voice presentable device and a tactile sense presentable device. A loudspeaker, an earphone, a headphone and so forth are included as the voice presentable devices.

The device setting unit 103 may set a voice presentation mode separately from the necessity/unnecessity of voice presentation which is set per voice presentable device. The voice presentation mode includes, for example, a normal mode, a muting mode and so forth. The normal mode is an operation mode for presenting the voice on the basis of a voice signal which is acquired. The muting mode is an operation mode for not presenting the voice which is based on the acquired voice signal. The muting mode is also called a manner mode.

The device setting unit 103 may set a vibration presentation mode independently of the necessity/unnecessity of the vibration presentation which is performed per vibration presentable device. There exist, for example, a vibration generation mode, a stationary mode and so forth in the vibration presentation mode. The vibration generation mode is an operation mode for presenting the vibration on the basis of a vibration signal which is acquired. The stationary mode is an operation mode for not presenting the vibration which is based on the vibration signal which is acquired. The vibration generation mode and the stationary mode are also called a vibration mode, a silent mode and so forth respectively.

The device setting unit 103 sets the necessity/unnecessity of the voice presentation to a voice presentable device which is connected to itself, for example, on the basis of input data from the touch sensor 22 and sets the sound volume to a device for use in voice presentation to which the voice is to be presented. The device setting unit 103 outputs voice setting information which indicates the device for use in voice presentation to which the voice is to be presented and the sound volume to the voice processing unit 104. The device setting unit 103 may set the voice presentation mode on the basis of the input data from the touch sensor 22 and may contain information on the voice presentation mode in the voice setting information.

The device setting unit 103 sets the necessity/unnecessity of vibration presentation to a vibration presentable device which is connected to itself on the basis of the input data from the touch sensor 22 and outputs vibration setting information which indicates a device for use in vibration presentation to which the vibration is to be presented to the vibration control unit 110.

The device setting unit 103 may set the vibration presentation mode on the basis of the input data from the touch sensor 22 and may contain information on the vibration presentation mode in the vibration presentation information.

The function of the device setting unit 103 would be realized by executing, for example, a device setting API (Application Programming Interface) function of an operating system (OS: Operating System). The function of the device setting unit 103 may be also realized by calling the API function concerned in accordance with an application program (in the present application, sometimes called "app") which is to be executed. Incidentally, in the present application, execution of the program implies to execute processes which are instructed in various commands which are described in the program.

In a case where presentation of the voice is instructed, the voice processing unit 104 acquires a voice signal. Presentation of the voice and a voice signal which is to be presented would be possibly instructed to the voice processing unit 104, for example, in accordance with input data which is input from the input device 30, a command which is contained in the application which is being executed and so forth. The application concerned may be any one of, for example, a voice calling application, a recording and reproduction application, a voice synthesis application, a voice distribution application and so forth. The voice processing unit 104 may acquire the voice signal by any one of the following techniques. The voice processing unit 104 may input the voice signal, for example, from outside of the information processing device 1, may read out a voice signal which is stored in a storage medium of a host system in advance and may synthesize voice signals which indicate uttered voices which are obtained from text information.

The host system 10 functions as the sound source by execution of the application concerned. In the present application, there are cases where the voice signal which is acquired by the voice processing unit 104 is called a "sound source signal" and the voice signal which is generated in accordance with a writing operation is called a "written sound signal" for distinction. The writing operation indicates to operate the input device 30 while bringing the input device 30 into contact with the touch sensor 22 by mainly aiming to present the diagram on the display 21 and is also simply called writing, drawing and so forth.

The voice processing unit 104 outputs the acquired sound source signal to a device for use in voice presentation. In one or more embodiments, the input device 30 possibly serves as the device for use in voice presentation which is an output destination of the sound source signal. Incidentally, in a case where the muting mode (a manner mode) is instructed in the voice setting information, the voice processing unit 104 stops output of the sound source signal until cancellation of the muting mode is instructed next or the normal mode is instructed.

Incidentally, the device setting unit 103 may decide the sound volume of the voice signal which is input from a microphone 25 as the ambient sound volume. The voice signal which is input from the microphone 25 is not necessarily instructed as the sound source signal which is to be output to the device for use in voice presentation. In a case where the input device 30 is set as the device for use in vibration presentation or the device for use in voice presentation, the device setting unit 103 may output acoustic environment information which indicates the ambient sound volume which is determined to the input device 30. As will be described later, a wireless communication unit 29 is used in inputting/outputting operations which are performed together with the input device 30.

The display processing unit 102 performs data input or data edition in accordance with an inputting operation which is instructed in input data which is sent from the touch sensor 22. The data input or the data edition which is based on this inputting operation corresponds to drawing processing. The display processing unit 102 specifies, for example, a contact position which is instructed in the input data which is input at regular time intervals and forms a time series of the contact positions. The display processing unit 102 generates a movement locus on the basis of the time series of the contact positions which is formed and makes the display 21 display the movement locus on the basis of the time series of the contact positions which is formed.

The vibration control unit 110 provides the device for use in vibration presentation which is instructed in the vibration setting information which is input from the device setting unit 103 with vibration control information which is used for vibration control which is performed by the vibration unit 55 on the basis of the input data which indicates the inputting operation which is sent from the touch sensor 22. In one or more embodiments, the input device 30 would serve as the device for use in vibration presentation which is an output destination of the vibration signal. In the following description, there are cases where that the input device 30 is set as the device for use in vibration presentation is set as the premise. Incidentally, in a case where the stationary mode (the silent mode) is instructed in the vibration setting information, the vibration control unit 110 stops output of the vibration control information until releasing of the stationary mode is instructed next or until the vibration mode is instructed. The function of the vibration control unit 110 may be also realized by executing, for example, a device driver of the input device 30.

The vibration control unit 110 detects either the information on the contact position or the information on the contact pressure or both of them from the input data which indicates the contact with the touch sensor 22 as the vibration control information. The vibration control unit 110 outputs the vibration control information which is detected to the device for use in vibration presentation. The vibration control unit 110 may also estimate an angle between a direction of movement of a contact position of the input device 30 on the display screen and a longitudinal direction of the input device 30 as an azimuth angle from the input data. It is possible for the vibration control unit 110 to set, for example, a direction of displacement from a contact position which is obtained at the immediately previous time to a contact position which is obtained at that time point as a direction of movement of the input device 30. It is possible for the vibration control unit 110 to set a pen angle which is indicated in the input data as a longitudinal orientation of the input device 30 which is obtained at that time point. The vibration control unit 110 may also output information which indicates the estimated azimuth angle to the input device 30 in a state of being contained in the vibration control information.

The wireless communication unit 29 transmits and receives various data to and from the input device 30 wirelessly by using a predetermined communication system.

Next, a schematic configuration example of the input device 30 will be described. The input device 30 includes a wireless communication unit 31, a device control unit 50 and the vibration unit 55.

The wireless communication unit 31 wirelessly transmits and receives various data to and from the information processing device 1 by using a predetermined communication system.

The device control unit 50 controls the function of the input device 30. For example, a sound source signal, voice setting information, vibration setting information and vibration control information are possibly input into the device control unit 50 from the information processing device 1 by using the wireless communication unit 31. The device control unit 50 synthesizes drive signals which are used to vibrate the vibration unit 55 on the basis of some or all pieces of the voice setting information, the vibration setting information and the vibration control information. The device control unit 50 outputs a drive signal which is obtained by synthesis to the vibration unit 55. Synthesis and control of the drive signal will be described later.

The vibration unit 55 vibrates in accordance with the drive signal which is input from the device control unit 50. Components of one of or both of the voice signal and the drive signal are contained in the drive signal. In vibration of the vibration unit 55, a vocal component which is based on the voice signal generates sound waves and is presented as the sound. In the vibration of the vibration unit 55, a vibration component which is based on the vibration signal is presented as the vibration.

In general, an audible band of human beings ranges from about 20 Hz to about 20 kHz and the sensitivity to a bandwidth from 500 Hz to 2 kHz is higher than the sensitivity to other frequency bands. In a lower frequency band, the sensitivity is lowered. On the contrary, in haptic senses of the human beings, the sensitivity to the bandwidth from 10 Hz to 100 Hz is higher than the sensitivity to other frequency band widths. In a higher frequency bandwidth, the sensitivity is lowered. In frequencies which exceed about 500 Hz, almost all of vibrations are not sensed. The vibration signal is mainly composed of low frequency components which are lower than about 200 Hz. On the contrary, the voice signal is mainly composed of high frequency components which are higher than about 500 Hz.

Figure 2:
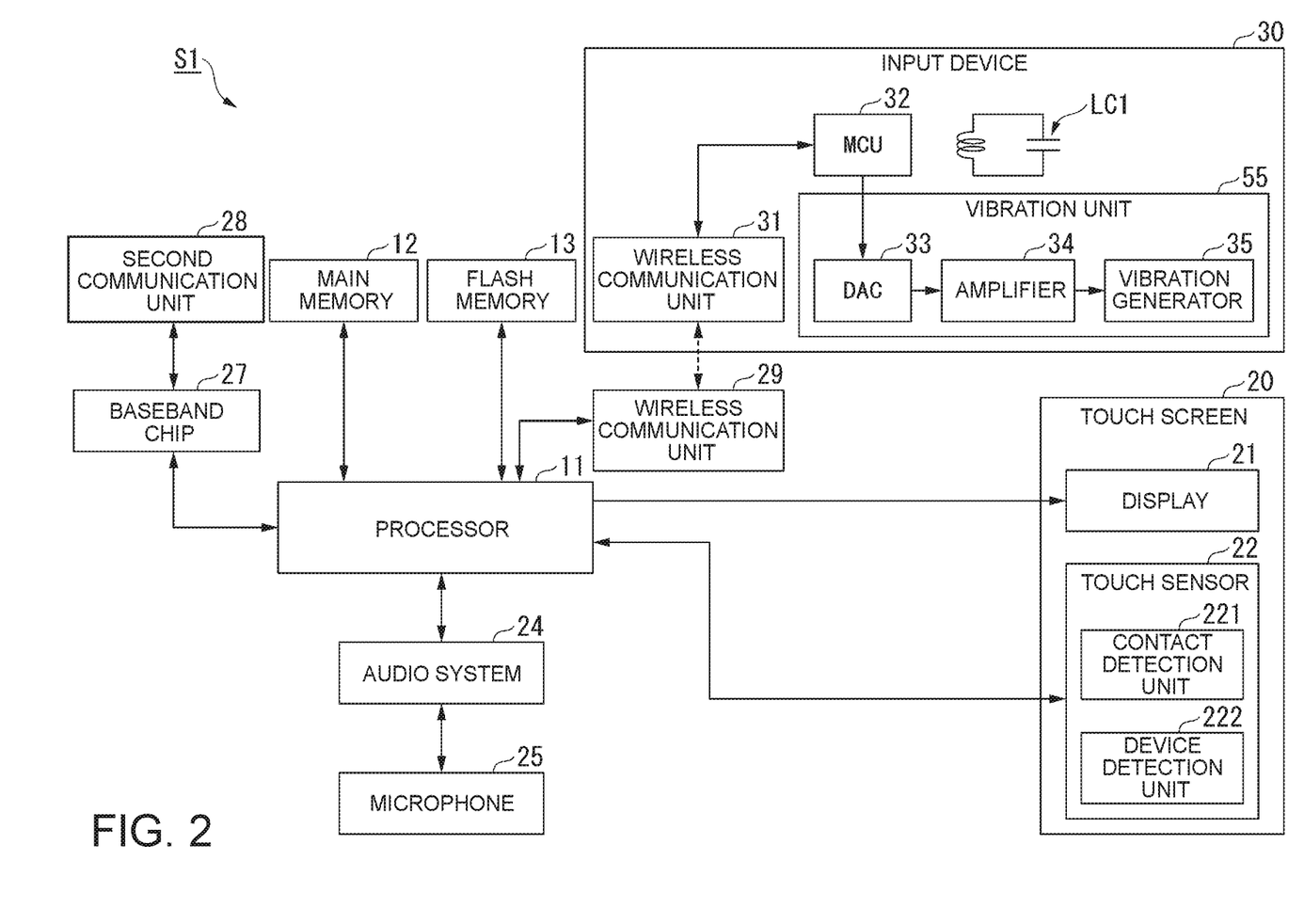
FIG. 2 is a block diagram illustrating one example of a hardware configuration of the information processing system according to one or more embodiments of the present application.

Next, an example of a hardware configuration of the information processing system S1 according to one or more embodiments will be described. FIG. 2 is a block diagram illustrating one example of the hardware configuration of the information processing system S1 according to one or more embodiments. The information processing system S1 includes the information processing device 1 and the input device 30. The information processing device 1 includes a processor 11, a main memory 12, a flash memory 13, the touch screen 20, an audio system 24, the microphone 25, a baseband chip 27, a second communication unit 28 and the wireless communication unit 29.

The processor 11 controls the functions of the entire of the information processing device 1. As the processor 11, for example, one CPU (Central Processing Unit) or more CPUs is/are used. The processor 11 executes a predetermined program and exhibits a function which serves as the host system 10 in cooperation with the main memory 12 and other hardware.

The main memory 12 is a writable memory which is utilized as a work area of the processor 11, that is, as an area into which an execution program and various kinds of setting data are read and as an area into which processing data which is acquired by execution of the program is written. The main memory 12 is configured by including, for example, a plurality of DRAM (Dynamic Random Access Memory) chips. An OS), various device drivers for controlling peripheral equipment and so forth, various services/ utilities, applications and so forth are contained in the execution program.

The OS, the various device drivers, the various services/ utilities, the applications and the various pieces of data are stored into the flash memory 13 in advance.

The display 21 displays various kinds of display screens which are based on display data which is output from the processor 11. The display 21 may be any of, for example, a liquid crystal display, an organic electroluminescence display and so forth.

The touch sensor 22 includes a contact detection unit 221 and a device detection unit 222.

The contact detection unit 221 detects an object (in the present application, mainly the input device 30) which comes into contact with the display screen and a contact position thereof. The contact detection unit 221 detects a contact pressure of the object which comes into contact with the display screen. The contact detection unit 221 is, for example, an electrostatic capacity pressure sensor. The contact detection unit 221 may detect also an inclination of the object which comes into contact with the display screen, that is, a pen angle. In a case where the contact detection unit 221 is a three-axis pressure sensor, it becomes possible to specify the pen angle by using a direction cosine relative to a pressure which acts in each axial direction.

The device detection unit 222 detects the input device 30 which does not yet come into contact with itself but comes closer to itself and detects a position thereof as an approach position. The device detection unit 222 includes, for example, an electromagnetic inductive sensor. The electromagnetic inductive sensor detects an AC current-induced magnetic field which generates in a resonance circuit LC1 by coming closer thereto. The resonance circuit LC1 is installed in the input device 30. It becomes possible for the electromagnetic inductive sensor to detect whether the input device 30 approaches depending on whether there exists a position where the magnitude of the magnetic field which is detected at its own resonance frequency exceeds a fixed value. It becomes possible for the electromagnetic inductive sensor to specify a position where the magnitude of the detected magnetic field exceeds the fixed value as a position where the input device 30 approaches.

The audio system 24 performs various types of processing to the voice signal such as inputting, outputting, recording, reproducing, encoding, and decoding. The audio system 24 includes, for example, an audio IC (Integrated Circuit). The microphone 25 is connected to the audio system 24. A voice presentable device, for example, the input device 30 is connected to the audio system 24.

The voice signal would possibly be input into the audio system 24 from the processor 11, the microphone 25 or the baseband chip 27. The audio system 24 reads out the voice signal which is recorded in itself. The audio system 24 outputs the voice signal to the processor 11. There are cases where the voice signal which is output to the voice presentable processor 11 is output to other equipment which is connected with the second communication unit 28 via the baseband chip 27 by using a communication network or is output to the input device 30 via the wireless communication unit 29 as a sound source signal.

The microphone 25 collects ambient sounds which arrive from its surroundings and outputs the voice signal of the ambient sounds to the audio system 24.

The baseband chip 27 is a dedicated IC for controlling communication which is performed by using the second communication unit 28. The baseband chip 27 realizes communication which is performed by using public wireless communication systems such as, for example, 4G (the 4$^{th}$ Generation Mobile Communication System), 5G (the 5$^{th}$ Generation Mobile Communication System), and an in-flight wireless communication network which is regulated in IEEE 802.11. The baseband chip 27 is so connected with other equipment as to make to possible to transmit and receive various kinds of data over the communication network by using the second communication unit 28 in accordance with the control from the processor 11 and thereby transmits and receives various kinds of data.

The second communication unit 28 is a wireless communication module which is adapted to be connected with the wireless communication network. The second communication unit 29 includes an antenna which transmits and receives radio waves.

The wireless communication unit 29 is a wireless communication module which is adapted to perform radio data transmission and reception together with the input device 30. It is possible for the wireless communication unit 28 to use, for example, the wireless PAN (Personal Area Network) system which is regulated in IEEE802.15.1 as the communication system.

The input device 30 is an operation medium which has an elongated shape that the length is larger than the radius. The input device 30 includes the wireless communication unit 31, an MCU (Micro Control Unit) 32, the vibration unit 55 and the resonance circuit LC1.

The wireless communication unit 31 is a wireless communication module which is adapted to perform radio data transmission and reception together with the wireless communication unit 29 of the information processing device 1.

The MCU 32 controls the functions of the input device 30 all-inclusively. The MCU 32 includes a processor, memories such as a ROM, a RAM and various kinds of input/output interfaces. The MCU 32 operates independently of the information processing device 1. The MCU 32 executes a predetermined program and exhibits a function that the MCU 32 works as the above-described device control unit 50.

Voice setting information and vibration control information are input into the MCU 32 from the information processing device 1 by using the wireless communication unit 31. The MCU 32 synthesizes drive signals by using one or both of the voice setting information and the vibration control information. The MCU 32 outputs the synthesized drive signal to the vibration unit 55.

The vibration unit 55 includes a DAC (Digital-to-Analog Converter) 33, an amplifier 34 and a vibration generator 35.

The DAC 33 converts a digital drive signal which is input from the MCL 32 to an analog drive signal. The DAC 33 outputs the analog drive signal which is so converted to the amplifier 34.

The amplifier 34 adjusts the amplitude of the drive signal which is input from the DAC 33 and outputs the drive signal which is adjusted in amplitude to the vibration generator 35.

The vibration generator 35 is an actuator which generates vibrations in accordance with a drive signal which is input from the amplifier 34. The vibration generator 35 includes a piezoelectric vibration unit such as, for example, a piezoelectric element.

The resonance circuit LC1 is an electric circuit which generates electric currents which resonate at a fixed resonance frequency. The resonance circuit LC1 is configured by connecting together, for example, a coil and a capacitor in series with each other. The resonance circuit LC1 makes a magnetic field the polarity of which fluctuates at a resonance frequency thereof generate with the use of alternating electric currents that the resonance circuit LC1 itself generates. Approaching of the input device 30 is detected by the device detection unit 222 of the touch sensor 22 with the aid of the magnetic field which is generated.

Figure 3:
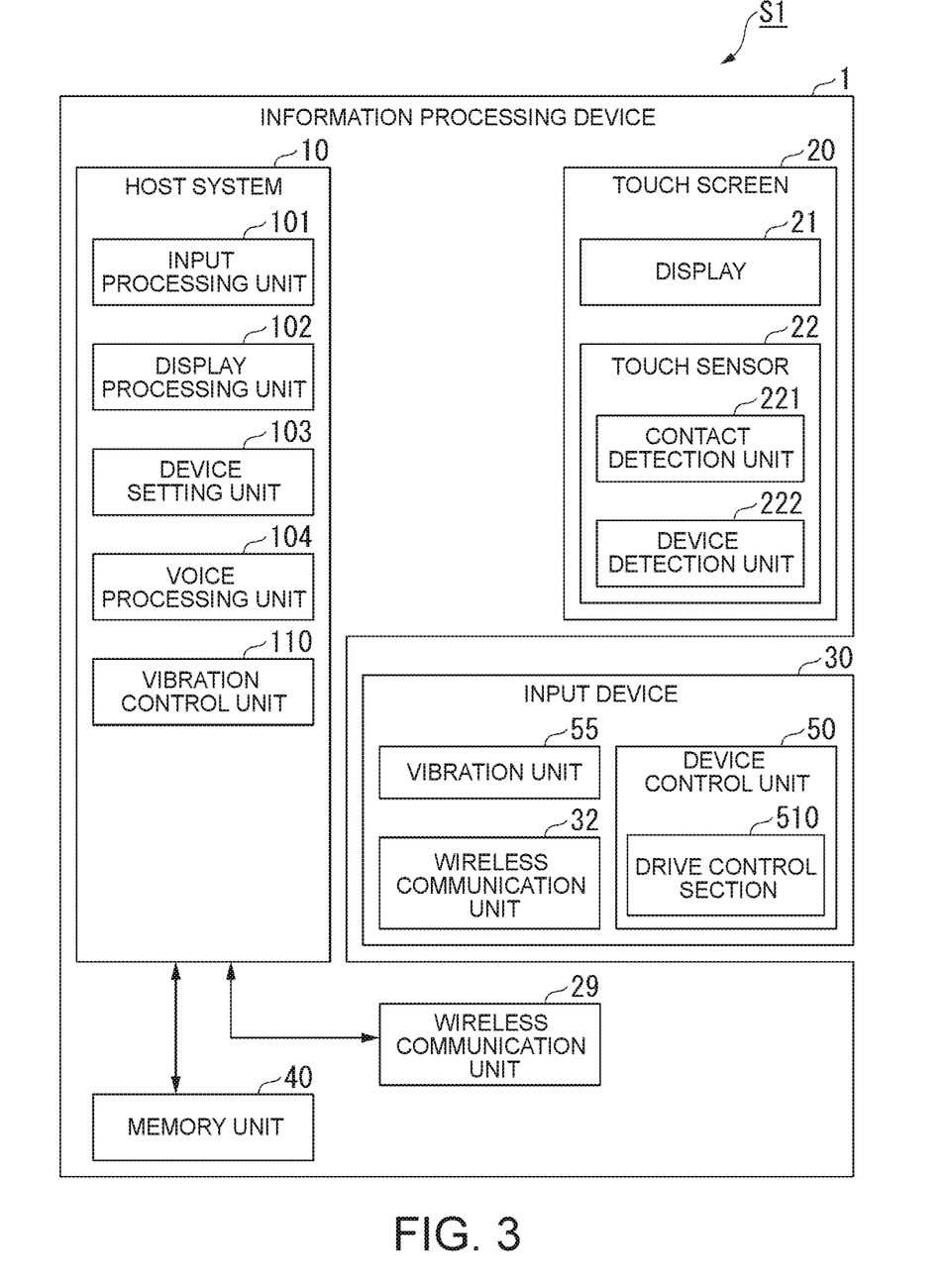
FIG. 3 is a block diagram illustrating one example of a first functional configuration of the information processing system according to one or more embodiments of the present application.

Next, an example of the functional configuration of the information processing system S1 according to one or more embodiments will be described.

FIG. 3 is a block diagram illustrating one example of the functional configuration of the information processing system S1 according to one or more embodiments. In the example in FIG. 3, points which are different from the points in FIG. 1 and FIG. 2 will be mainly described. With respect to points which are common with the points in FIG. 1 and FIG. 2, the common codes are assigned thereto and the above description will be invoked unless otherwise asked for permission.

The information processing system S1 includes the information processing device 1 and the input device 30.

The information processing device 1 includes the host system 10, the touch screen 20, the wireless communication unit 29 and a memory unit 40. The memory unit 40 is realized by, for example, the flash memory 13.

The host system 10 includes the input processing unit 101, the display processing unit 102, the device setting unit 103, the voice processing unit 104 and the vibration control unit 110.

The input device 30 includes the wireless communication unit 31, the device control unit 50 and the vibration unit 55.

The input processing unit 101 controls input of input data which is sent from the touch sensor 22. The processor 11 executes, for example, a device driver of the touch sensor 22 and thereby the function of the input processing unit 101 is realized. The input processing unit 101 outputs the input data which is input from the touch sensor 22 to the vibration control unit 110 in accordance with a command from the OS.

The input device 30 includes a drive control section 510 in the device control unit 50.

The drive control section 510 controls driving of the vibration unit 55 on the basis of the sound source signal and some or all pieces of the voice setting information, the vibration setting information and the vibration controlling information which are input by using the wireless communication unit 31 as described above. The drive control section 510 acquires the drive signal which contains one of or both of the writing sound signal and the vibration signal as a component or components and outputs the drive signal which is acquired to the vibration unit 55.

In a case where the vibration mode is instructed in the vibration setting information, the drive control section 510 operates to contain the vibration signal which is generated in itself in the drive signal. In that case, the vibration is presented from the input device 30. In a case where the stationary mode is instructed in the vibration setting information, the drive control section 510 does not contain the vibration signal which is generated in itself in the drive signal. In that case, the vibration is not presented from the input device 30.

In a case where the vibration setting information and the vibration control information which indicate the vibration mode are input, the drive control section 510 generates the vibration signal. Contact with the touch sensor 22 is notified in the vibration control information. In generation of the vibration signal, the drive control section 510 generates the vibration signal which indicates the vibration component with reference to the reference vibration waveform information which is set in itself in advance. The reference vibration waveform information is information which indicates the vibration waveform which is defined as a reference.

In addition, the drive control section 510 has a function that it serves as the sound source which generates a writing sound signal in a case where the voice setting information which indicates the normal mode is input and generates the writing sound signal which indicates a voice component on the basis of the voice setting information with reference to the reference voice waveform information which is set in advance. Thereby, the vibration and the voice which are generated in association with writing are presented. In a case where the sound source signal is input from the information processing device 1, the drive control section 510 may stop generation of the writing sound signal. Accordingly, in a case where the sound source signal is provided from the information processing device 1, priority is given to presentation of the voice which relates to the sound source signal and presentation of the writing sound is stopped.

The drive control section 510 may also control output characteristics of the drive signal on the basis of a state of contact with the touch sensor 22 which is instructed in the vibration control information. For example, in a case where information on a contact position is contained as the contact state, the drive control section 510 more increases the amplitudes of the writing sound signal and the vibration signal which are generated as a moving speed of the contact position becomes higher. In a case where the moving speed is reduced to zero, the drive control section 510 reduces the amplitudes of the writing sound signal and the vibration signal to zeros and stops output of the drive signal. In a case where information on a contact pressure is contained as the contact state, the drive control section 510 may more increase the amplitudes of the writing sound signal and the vibration signal as the contact pressure becomes higher.

Figure 4:
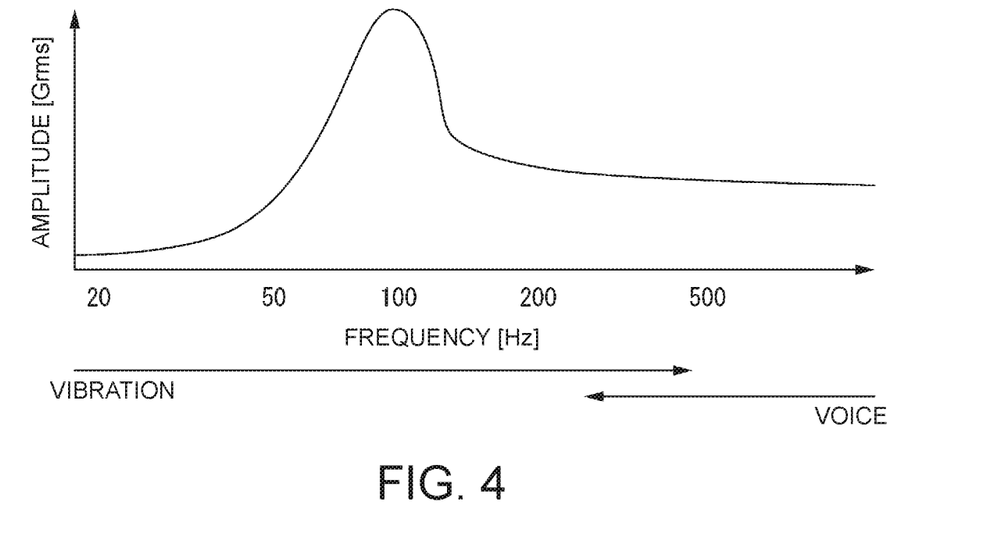
FIG. 4 is a diagram illustrating one example of an output characteristic of a vibration generator pertaining to one or more embodiments of the present application.

Next, one example of the output characteristics of the vibration generator 35 pertaining to one or more embodiments will be illustrated. FIG. 4 is a diagram illustrating one example of the output characteristic of the vibration generator 35 pertaining to one or more embodiments. The horizontal axis and the vertical axis in FIG. 4 indicate a frequency (Hz) and an amplitude (Grms: an effective acceleration) respectively. As the amplitude, an amplitude of the effective acceleration which generates in the vibration generator 35 relative to frequency-based constant driving electric power is indicated. FIG. 4 indicates that as the value of the amplitude is increased, the vibration unit 55 vibrates at a higher efficiency. The amplitude reaches the maximum roughly at about 100 Hz. In a frequency band which is lower than about 100 Hz, the lower the frequency is, the smaller the amplitude becomes. In a band which is higher in frequency, the higher the frequency is, the smaller the amplitude becomes. However, a reduction in the amplitude in a higher band is gentler than that in a lower band. This indicates that presentation of a voice which contains a high band which is mainly perceived as the voice and is not perceived as the vibration as a main component is possible. It becomes possible for the drive control section 510 to control the output characteristic of a voice component by adjusting the amplitude of mainly a high-band output characteristic.

Next, one example of a method of controlling the voice signal will be described. In a case where the normal mode is instructed in the voice setting information, the drive control section 510 includes the sound source signal which is input into itself or the writing sound signal which is generated in itself in a drive signal. In this case, the voice or the writing sound which relates to the sound source signal is presented from the input device 30. In a case where the silent mode is instructed in the voice setting information, the drive control section 510 does not contain the sound source signal or the writing sound signal in the drive signal. In this case, the voice or the writing sound which pertains to the sound source signal is not presented from the input device 30.

Figure 5:
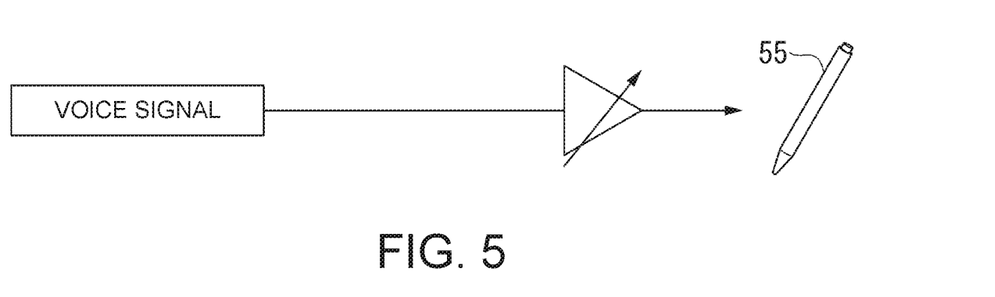
FIG. 5 is a diagram illustrating a first driving example of a vibration unit pertaining to one or more embodiments of the present application.

In a case where information on the sound volume (the pen sound volume) which is input into the input device 30 is contained in the voice setting information, the drive control section 510 adjusts the amplitude of the sound source signal which is the voice signal or the writing sound signal in accordance with that sound volume. As illustrated in FIG. 5, the drive control section 510 may include a variable amplifier and may set a gain which corresponds to the sound volume in the variable amplifier. The sound source signal or the writing sound signal is input into the variable amplifier and the sound source signal or the writing sound signal which is obtained after amplitude adjustment is output to the variable amplifier. The drive control section 510 may also set, in advance, a voice control table which indicates a relation between the ambient sound volume and the gain and may specify the gain which corresponds to the ambient sound volume which is indicated in the acoustic environment information with reference to the voice control table. The drive control section 510 adjusts the sound volume of the sound source signal or the writing sound signal by using the gain which is specified.

Even in a case where the voice setting information is not input or in a case where the voice setting information which indicates the normal mode is input, the drive control section 510 may decide the necessity/unnecessity of the voice presentation on the basis of the vibration control information.

The drive control section 510 decides whether a writing operation is stopped in the state of contact with the touch sensor 22, for example, on the basis of the vibration control information. In a case where the contact pressure is higher than a predetermined contact judgement pressure and a moving speed is lower than a predetermined stationary judgement speed, it becomes possible for the drive controlling section 510 to decide that the writing operation is stopped in the state of contact with the touch sensor 22. It becomes possible for the drive control section 510 to control whether the sound source signal which is input into itself from the information processing device 1 is to be contained in the drive signal in accordance with whether the writing operation is stopped in the state of contact with the touch sensor 22. Accordingly, in a case where the writing operation is stopped in the state of contact with the touch sensor 22, a voice which is based on the sound source signal which is input from the information processing device 1 is presented. In this case, since the writing operation is stopped, it becomes possible for the drive control section 510 to reduce the component of a writing signal and the component of the vibration signal which are based on the vibration control information to zeros and to stop presentation of the writing sound and the vibration.

In a case where information which indicates the ambient sound volume is contained in acoustic environment information which is input into itself, the drive control section 510 may control the output characteristic of the sound source signal on the basis of the ambient sound volume. For example, the larger the ambient sound volume is, the more the drive control section 510 may increase the sound volume of the sound source signal which is input. Thereby, the voice which relates to the sound source signal the presentation of which is instructed from the information processing device 1 is heard without being interfered with the ambient sounds. On the other hand, in a case where the ambient sound volume is larger than a predetermined reference sound volume, the drive control section 510 stops output of the writing sound signal.

Figure 6:
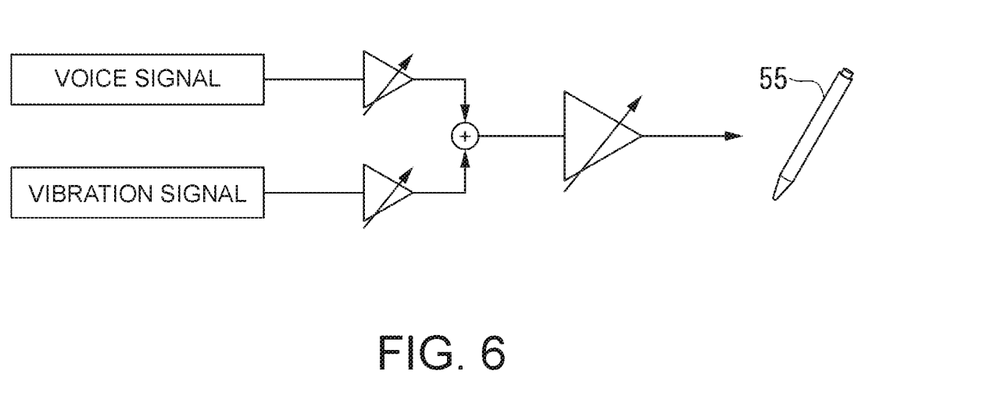
FIG. 6 is a diagram illustrating a second driving example of the vibration unit pertaining to one or more embodiments of the present application.

For generation of a driving signal which accords with the writing operation, a reference waveform signal and a control table 3 (not illustrated) are set in advance in the drive control section 510. A reference vibration waveform signal and a reference voice waveform signal are included in the reference waveform signal. The reference vibration waveform signal and the reference voice waveform signal indicate a time series of vibration components and a time series of voice components respectively. As illustrated in FIG. 6, the drive control section 510 includes variable amplifiers which are prepared for the voice signal and the vibration signal respectively, a mixer (an adder) and a variable amplifier which is to be used in common. Information which indicates a correspondence relation between the ambient sound volume and the gain and a correspondence relation between a set of a moving speed and a contact pressure and the gain to a common variable amplifier are set in advance in the control table.

In generation of the drive signal, the drive control section 510 reads out the reference voice waveform signal and the reference vibration waveform signal which are set and supplies these signals to their corresponding variable amplifiers respectively. The drive control section 510 determines a gain which corresponds to the ambient sound volume which is notified in the acoustic environment information with reference to the control table and sets the gain which is determined in the variable amplifier which corresponds to the voice signal. A fixed gain may be set in advance in the variable amplifier which corresponds to the vibration signal. The voice signal and the vibration signal which are obtained after amplitude adjustment by the variable amplifiers are supplied to the mixer and a drive signal that the both signals are synthesized is input into a common variable amplifier from the mixer.

The drive control section 510 specifies a moving speed and a contact pressure of a contact position on the basis of a contact state which is notified in the vibration control information. The drive control section 510 sets a gain which corresponds to a set of the moving speed and the contact pressure which are specified with reference to the control table and sets the gain which is decided to the common variable amplifier. A drive signal whose amplitude is adjusted with the gain which is set and is output from the common variable amplifier to the vibration unit 55.

Incidentally, the reference voice waveform signal is not necessarily limited to a friction sound which is induced by friction between a writing instrument and a writing medium such as paper at the time of writing and may be ones which indicate a warning sound and other notification sounds. Incidentally, the drive control section 510 may generate the sound source signal uniquely in place of input of the sound source signal from the information processing device 1. The drive control section 510 may also generate the sound source signal in accordance with control of the voice processing unit 104 of the information processing device 1.

The drive control section 510 may uniquely synthesize the vibration signals. For example, in a case where the vibration control information has information on azimuth angles, the drive control section 510 may synthesize the vibration signals which correspond to the azimuth angles as vibration signals to be processed. In that case, reference waveform information and a synthesis table are stored into the drive control section 510 in advance. The reference waveform information is information which indicates a reference waveform for each of the plurality of reference azimuth angles which are set in advance. It is sufficient that three or more reference azimuth angles be set between 0° and 180°. The synthesis table is a data table which indicates a synthesis ratio of the azimuth angle relative to the reference waveform per reference azimuth angle. The drive control section 510 decides the synthesis ratio to the azimuth angle which is notified per reference azimuth angle with reference to the synthesis table. It becomes possible for the drive control section 510 to generate a weighted sum of vibration waves among the reference azimuth angles that the decided synthesis ratio is set as a weighting factor as a vibration signal.

Figure 7:
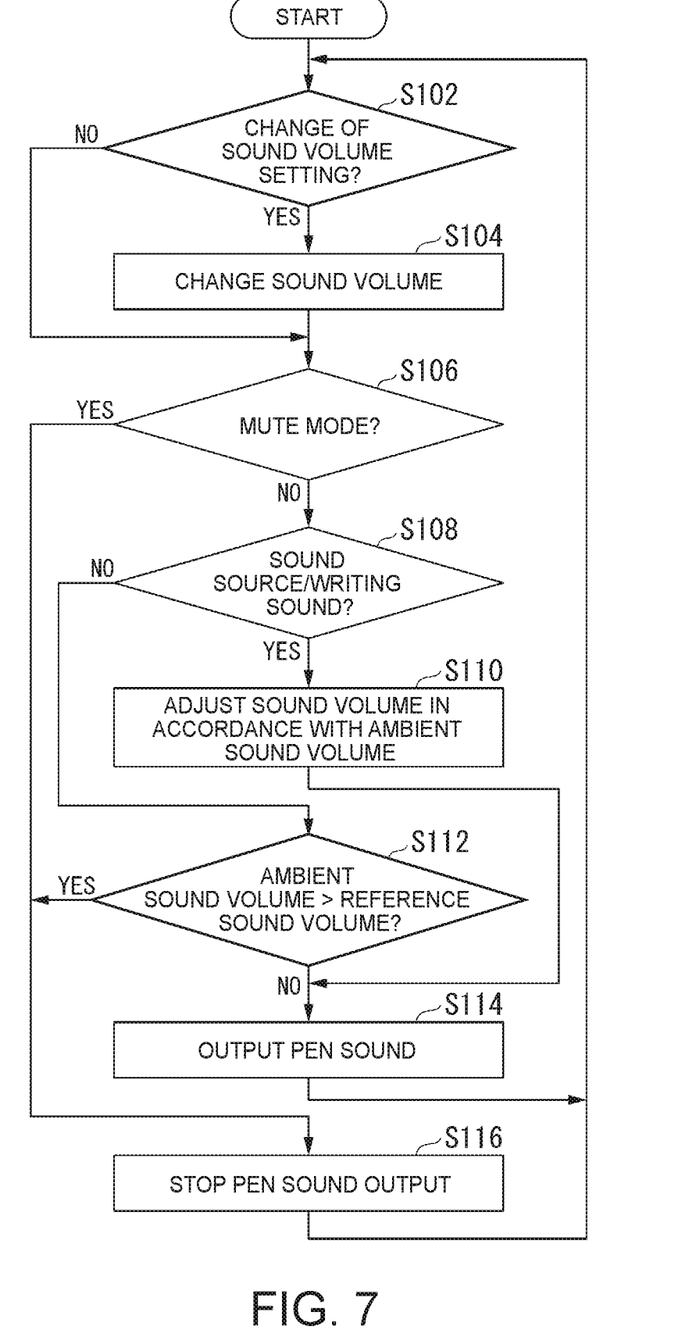
FIG. 7 is a flowchart illustrating one example of voice output control pertaining to one or more embodiments of the present application.

Next, one example of voice output control pertaining to one or more embodiments of the present application will be described. FIG. 7 is a flowchart illustrating one example of the voice output control pertaining to one or more embodiments.

(Step S102) The drive control section 510 of the input device 30 receives the voice setting information which is input from the information processing device 1 and monitors information on the sound volume which is contained in the voice setting information. The drive control section 510 decides whether the sound volume which is to be set is changed. In a case where it is decided that the sound volume is changed (step S102 YES), the flow proceeds to the process in step S104. In a case where it is decided that the sound volume is not changed (step S102 NO), the flow proceeds to the process in step S106.

(Step S104) The drive control section 510 changes the sound volume of the voice signal to the sound volume which is notified in the voice setting information.

(Step S106) The drive control section 510 decides whether the voice presentation mode which is contained in the voice setting information is the silent mode. In a case where the voice presentation mode is the silent mode (step S106 YES), the flow proceeds to the process in step S116. In a case where the mode is not the silent mode (step S106 NO), the flow proceeds to the process in step S108.

(Step S108) The drive control section 510 decides whether the voice which is based on the sound source signal is to be presented or decides whether the writing sound which is based on the vibration control signal is to be presented on the basis of whether the sound source signal is input from the information processing device 1. In a case where the voice which is based on the sound source signal is presented (step S108 YES), the flow proceeds to the process in step S110. In a case where the writing sound is presented (step S108 NO), the flow proceeds to the process in step S112.

(Step S110) The drive control section 510 adjusts the amplitude of the sound source signal such that the more the ambient sound volume which is instructed in the acoustic environment formation which is input from the information processing device 1 is increased, the more the sound volume is increased.

(Step S112) The drive control section 510 decides whether the ambient sound volume which is instructed in the acoustic environment information exceeds a predetermined reference sound volume. In a case where the ambient sound volume exceeds the reference sound volume (step S112 YES), the flow proceeds to the process in step S116. In a case where the ambient sound volume becomes lower than the reference sound volume (step S112 NO), the flow proceeds to the process in step S114.

(Step S114) The drive control section 510 outputs the sound source signal which is the voice signal or the writing sound signal to the vibration unit 55 in a state of being contained in the drive signal (pen sound output).

(Step S116) The drive control section 510 outputs the drive signal to the vibration unit 55 without containing the sound source signal or the writing sound signal therein (stop pen sound output). Then, the flow returns to the process in step S102.

Although in the above example, a case where the input device 30 includes the drive control section 510 and the drive signal is generated on the basis of some or all of the sound source signal, the voice setting information, the vibration setting information and the vibration control information which are input from the information processing device 1 is presupposed, the example is not limited thereto.

Figure 8:
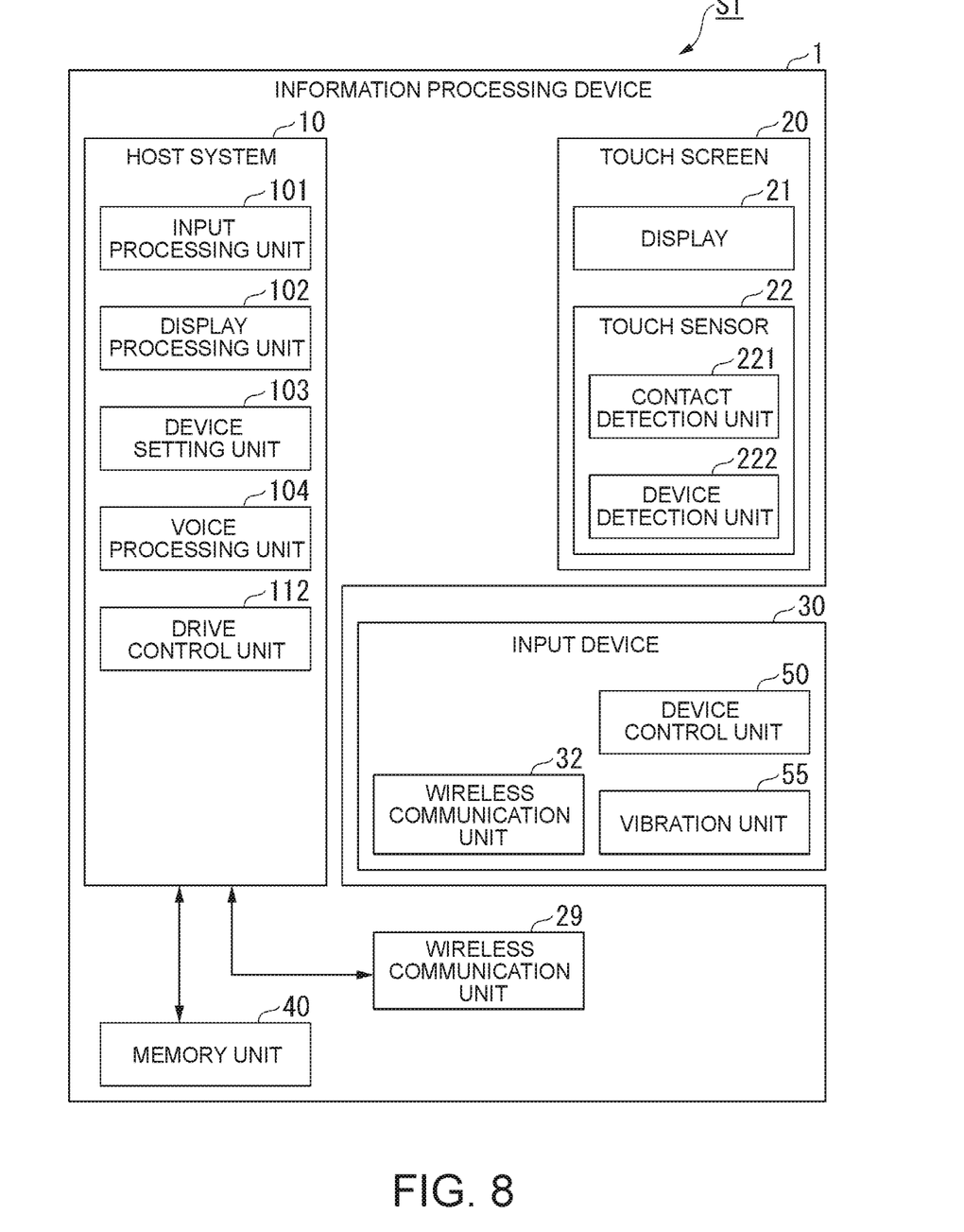
FIG. 8 is a block diagram illustrating one example of a second functional configuration of the information processing system according to one or more embodiments of the present application.

As illustrated in FIG. 8, the host system 10 of the information processing device 1 may include a drive control unit 112 in place of the vibration control unit 110.

The drive control unit 112 has a function which is the same as that of the vibration control unit 110 and acquires the vibration control information on the basis of the input data which is sent from the touch sensor 22. The drive control unit 112 may acquire the sound source signal from the voice processing unit 104 and may acquire the voice setting information and the vibration setting information from the device setting unit 103. The drive control unit 112 generates the drive signal on the basis of some or all of the sound source signal, the voice setting information, the vibration setting information and the vibration control information which are acquired by using the technique which is the same as that of the drive control section 510. The drive control unit 112 outputs the drive signal which is generated to the input device 30 by using the wireless communication unit 29. In the input device 30, the device control unit 50 outputs the drive signal which is input from the information processing device 1 by using the wireless communication unit 31 to the vibration unit 55. In this example, in the input device 30, the drive control section 510 may be omitted.

In addition, although, in the above-described example, a case where the information processing device 1 is the tablet terminal device is mainly described, the information processing device 1 is not limited thereto. The information processing device 1 may be information communication equipment of other form which makes information input possible by using the input device 30 such as a multifunction mobile phone (a so-called smartphone is included), and a personal computer. In addition, the information processing device 1 may also include dedicated hardware for generating the sound source signal as the sound source.

In addition, one or both of the display 21 and the touch sensor 22 may be installed separately from the information processing device 1 as long as it is possible to connect one or both of the display 21 and the touch sensor 22 with other members of the information processing device 1 in a wired or wireless state.

As described above, the information processing system S1 according to one or more embodiments includes the information processing device 1 and the input device 30. The information processing device 1 includes the host system 10 which makes the display 21 display the diagram which is based on the inputting operation of the input device 30 which is detected by the touch sensor 22. The controller (for example, the MCU 32) of the host system 10 or the input device 30 acquires the voice signal and the input device 30 includes the vibration generator 35 which vibrates in accordance with the drive signal which contains the voice signal.

The information processing device 1 may include the touch sensor 22 and the display 21 and the controller of the host system 10 or the input device 30 may also include a mixer which generates the vibration signal on the basis of the state of contact with the touch sensor 22 and generates the drive signal by synthesizing the vibration signal and the voice signal.

In addition, the voice signal may have a frequency component which is more than 300 Hz and the vibration signal may have a frequency component which is less than 500 Hz.

In addition, the host system 10 may also have a function of serving as the sound source which generates the sound source signal.

Owing to this configuration, it becomes possible to make the vibration generator 35 generate the vibration by using the voice signal and to transmit the vibration to the input device 30 which is adapted to make the diagram display on the display 21 by the inputting operation. It becomes possible to make the voice present from the input device 30 which is predicted as the voice generation source with no fresh installation of a device for voice presentation. Accordingly, it becomes possible to realize presentation of the voice economically and with no uncomfortable feeling.

In a case where the writing sound signal which indicates the writing sound is generated on the basis of the state of contact with the touch sensor 22 by the inputting operation, the writing sound signal is output to the vibration generator 35 as the voice signal and the host system 10 acquirers the sound source signal which is the voice signal from the sound source, the controller of the host system 10 or the input device 30 may stop output of the writing sound signal.

Owing to this configuration, in a case where the voice signal which is generated from the sound source is output to the input device 30, output of the writing sound signal is stopped. Therefore, in a case where it becomes impossible to hear the writing sound due to presence of the voice which is generated from the sound source, presentation of useless writing sounds is stopped and it becomes possible to give priority to the presentation of the voice from the sound source.

In a case where the input device 30 is at a standstill in the state of contact with the touch sensor 22, the controller of the host system 10 or the input device 30 may output the sound source signal to the vibration generator 35 and may stop output of the writing sound signal to the vibration generator 35.

Owing to this configuration, in the case where the input device 30 is at the standstill in the state of contact with the touch sensor 22, it becomes possible to transmit the vibration which is generated from the vibration generator 35 on the basis of the sound source signal to the touch sensor 22 and thereby to increase the area of a vibration surface. Accordingly, in a case where the writing sound which is to be generated by the inputting operation is not generated, the voice which pertains to the sound source is effectively presented.

The controller of the host system 10 or the input device 30 may also control the output characteristic of the voice signal in accordance with the sound volume of the ambient sounds which are picked up by the microphone 25.

Owing to this configuration, the volume of the sound which is generated from the input device 30 is adjusted in accordance with the sound volume of the ambient sounds.

The controller of the host system 10 or the input device 30 may also increase the sound volume of the sound source signal as the sound volume of the ambient sounds is increased.

Owing to this configuration, since the more the sound volume of the ambient sounds is increased, the more the sound volume of the sound source signal is increased, the sound which pertains to the sound source is heard without being disturbed by the ambient sounds.

In a case where the sound volume of the ambient sounds exceeds a predetermined reference sound volume, the controller of the host system 10 or the input device may stop output of the writing sound signal.

Owing to this configuration, in a case where the sound volume of the ambient sounds reaches a big sound volume which exceeds the reference sound volume, presentation of the writing sound is stopped. In a case where it becomes impossible to hear the writing sound due to presence of the ambient sounds, presentation of the useless writing sound is stopped.

Although embodiments of the present application have been described in detail with reference to the drawings as above, the concrete configuration is not limited to the above-described embodiments and also designs and so forth which fall within a range not deviating from the gist of the present application are also included. It is possible to combine together the respective configurations which are described in the above embodiments at will.

DESCRIPTION OF SYMBOLS

S1 information processing system
1 information processing device
10 host system
11 processor
12 main memory
13 flash memory
20 touch screen
21 display
22 touch sensor
24 audio system
25 microphone
27 baseband chip
28 second communication unit
29 wireless communication unit
30 input device
31 wireless communication unit
32 MCU
33 DAC
34 amplifier
35 vibration generator
40 memory unit
50 device control unit
55 vibration unit
101 input processing unit
102 display processing unit
103 device setting unit
104 voice processing unit
110 vibration control unit
112 drive control unit
510 drive control section
221 contact detection unit
222 device detection unit

The invention claimed is:

1. An information processing system comprising:
an information processing device comprising:
a memory;
a processor coupled to the memory;
a display with a touch sensor; and
an input device comprising:
a controller; and
a vibration generator coupled to the controller, wherein
the processor is configured to control display of a diagram on the display which is based on an inputting operation which is performed by using the input device and is detected by the touch sensor on the display,
the controller of the input device is configured to control the vibration generator to vibrate in accordance with a drive signal which includes a voice signal portion in a first frequency range of the vibration generator and a vibration signal portion in a second frequency range of the vibration generator.

2. The information processing system according to claim 1, wherein
the processor of the information processing device or the controller of the input device is configured to generate a writing sound signal which indicates a writing sound on the basis of a state of contact with the touch sensor by the inputting operation,
the controller is configured to:
output the writing sound signal to the vibration generator as the voice signal portion; and
stop output of the writing sound signal as the voice signal portion in a case where the processor outputs a sound source signal as the voice signal portion, and
the sound source signal is acquired by the processor from a sound source.

3. The information processing system according to claim 2, wherein
the controller is configured to:
output the sound source signal as the voice signal portion of the drive signal to the vibration generator; and
stop output of the writing sound signal as the voice signal portion of the drive signal to the vibration generator in a case where the input device is at a standstill in a state of contact with the touch sensor.

4. The information processing system according to claim 2, wherein
the processor of the information processing device or the controller of the input device is configured to control an output characteristic of the voice signal portion in accordance with a sound volume of ambient sounds which are picked up by a microphone of the information processing device.

5. The information processing system according to claim 4, wherein
the processor of the information processing device or the controller of the input device is configured to increase the sound volume of the sound source signal as the sound volume of the ambient sounds is increased.

6. The information processing system according to claim 4, wherein
the processor of the information processing device or the controller of the input device is configured to stop output of the writing sound signal in a case where the sound volume of the ambient sounds exceeds a predetermined reference sound volume.

7. The information processing system according to claim 1, wherein
the information processing device includes the touch sensor and the display, and
the processor of the information processing device or the controller of the input device includes a mixer which is configured to generate the vibration signal portion on the basis of the state of contact with the touch sensor and to generate the drive signal by synthesizing the vibration signal portion and the voice signal portion.

8. The information processing system according to claim 7, wherein
the voice signal portion has a frequency component which is more than 300 Hz, and
the vibration signal portion has a frequency component which is less than 500 Hz.

9. The information processing system according to claim 2, wherein
the processor of the information processing device has a function that it serves as the sound source which generates the sound source signal.

10. An information processing system comprising:
an information processing device comprising:
 a memory;
 a processor coupled to the memory;
a display with a touch sensor; and
an input device comprising:
 a controller; and
 a vibration generator coupled to the controller, wherein
the processor is configured to control display of a diagram on the display which is based on an inputting operation which is performed by using the input device and is detected by the touch sensor on the display,
the controller of the input device is configured to control the vibration generator to vibrate in accordance with a drive signal which includes a voice signal portion which is more than 300 Hz and a vibration signal portion which is less than 500 Hz,
the processor of the information processing device or the controller of the input device includes a mixer which is configured to generate the vibration signal portion on the basis of the state of contact with the touch sensor and to generate the drive signal by synthesizing the vibration signal portion and the voice signal portion.

11. The information processing system according to claim 10, wherein
the generating of the drive signal includes an independent amplification stage for each of the vibration signal portion and the voice signal portion before synthesizing into the drive signal.

12. The information processing system according to claim 11, wherein
a first gain value for the independent amplification stage for the vibration signal portion is fixed, and
a second gain value for the independent amplification stage for the voice signal portion is variable and controlled based on an ambient sound volume.

13. The information processing system according to claim 11, wherein
the generating of the drive signal includes a common amplification stage after synthesizing the vibration signal portion and the voice signal portion into the drive signal.

* * * * *